United States Patent [19]
Finnemore

[11] Patent Number: 5,738,711
[45] Date of Patent: Apr. 14, 1998

[54] DEFLECTOR AND SCREEN ARRANGEMENT FOR ASH SEPARATION FROM FLUE GAS AND METHOD THEREOF

[75] Inventor: Harlan E. Finnemore, Pocatello, Id.

[73] Assignee: ABB Air Preheater, Inc., Wellsville, N.Y.

[21] Appl. No.: 759,721

[22] Filed: Dec. 6, 1996

[51] Int. Cl.⁶ .......................... B01D 45/06; B01D 50/00
[52] U.S. Cl. ................. 95/268; 55/321; 55/324; 55/344; 55/419; 55/443
[58] Field of Search .......... 95/268, 267; 55/320, 55/321, 322, 323, 324, 325, 326, 418, 419, DIG. 14, 344, 465, 434, 442, 443

[56] References Cited

U.S. PATENT DOCUMENTS

| | | | |
|---|---|---|---|
| 1,103,509 | 7/1914 | Harker | 55/322 |
| 1,338,143 | 4/1920 | McGee | 95/269 |
| 1,899,993 | 3/1933 | Spencer | 55/419 |
| 2,013,644 | 9/1935 | Bubar | 55/442 |
| 2,076,815 | 4/1937 | Fulweiler | 55/442 |
| 2,723,725 | 11/1955 | Keiffer | 55/325 |
| 3,237,386 | 3/1966 | Farr et al. | 55/443 |
| 3,409,131 | 11/1968 | Petersen et al. | 55/418 |
| 3,646,595 | 2/1972 | Williams | 55/418 |
| 3,791,108 | 2/1974 | Hausberg et al. | 55/DIG. 14 |
| 4,430,100 | 2/1984 | Cardo | 55/DIG. 14 |
| 4,472,182 | 9/1984 | Zimmerman et al. | 55/324 |

FOREIGN PATENT DOCUMENTS

| | | | |
|---|---|---|---|
| 386806 | 9/1990 | European Pat. Off. | 95/269 |

*Primary Examiner*—Duane S. Smith
*Attorney, Agent, or Firm*—Alix, Yale & Ristas, LLP

[57] ABSTRACT

An apparatus for the separation of ash from a flue gas stream has a hopper defining a flow chamber for the flue gas stream. The hopper has an upper portion and a lower portion. The upper portion defines a horizontal flue gas inlet opening and a vertical flue gas outlet opening. The lower portion defines a hopper collector opposite the inlet opening. A plurality of generally triangular planar block-off plates are oriented horizontally across the flue gas inlet opening and define a plurality of triangular initial flue path openings therebetween. A plurality of triangular flow plates are mounted to the block-off plates adjacent the flow path openings. The flow plates extend vertically downward toward the hopper collector whereby the flow plates define second flow path openings therebetween in fluid connection with the flue gas outlet opening.

16 Claims, 3 Drawing Sheets

DEFLECTOR AND SCREEN ARRANGEMENT FOR ASH SEPARATION FROM FLUE GAS AND METHOD THEREOF

BACKGROUND OF THE INVENTION

This invention relates to the separation of fly ash from the flue gas stream of a furnace. More particularly, this invention relates to the separation of ash from a flue gas by use of a deflector and screen arrangement. Various grades of coal and other solid fuels generate significant quantities of ash as a byproduct of combustion. This ash typically collects at the bottom of the furnace, but significant quantities of ash can become entrained in the flue gas stream exiting the furnace. Hoppers for the collection of ash from the flue gas stream are typically positioned downstream from the furnace in order to accumulate the ash entrained in the flue gas stream.

To improve furnace efficiency, conventional modern furnaces employ heat recovery devices, such as economizers and regenerative air preheaters to recover energy from the flue gas stream exiting the furnace. Additional downstream apparatus, such as pollution control devices, also interact with the flue gas stream.

The carry over of ash particulates into components located between the furnace economizer and the stack often becomes a severe problem. The accumulation of ash in these components is particularly problematic when the ash particles lodge in the heat transfer surfaces of the air preheater positioned immediately downstream from the furnace. Ash accumulation in the heat transfer matrix results in plugging of air passages and increased pressure differentials across the air preheater. It often becomes necessary to shut the furnace down and remove the ash accumulation from the air preheater matrix by means of a high pressure wash. This required cleaning leads to increased furnace downtime, and therefore, increased operational cost. Furthermore, the ash accumulation in the preheater can lead to lower efficiency of the overall power plant by increasing fan horsepower requirements to force the flue gas and incoming air streams through the air preheater. The ash accumulation can also reduce the thermal efficiency of the air preheater.

Conventional power plants employ an ash hopper between the economizer of the furnace and the air preheater to collect large particulates of ash from the flue gas stream. Screens can be positioned across the flue gas stream at the outlet duct of the ash hopper in order to increase ash removal. The screens can cover the entire duct, or cover only a portion of the duct and be staggered with additional partial screens. The screens are typically positioned vertically across the horizontal section of the outlet duct downstream of the hopper, or can be tipped away from the hopper at their upper edges. In either the vertical arrangement of the screens or where the screens are tipped away from the hopper, the pressure of flue gas stream tends to hold the ash in position on the screen once the ash has impacted the screen surface. This holding of the ash against the screen results in plugging of the screen and decreased flow of the flue gas stream. The plugging of the screens increases power plant operating cost.

Furthermore, duct bracing and other structures extending into the flue gas stream can experience severe erosion due to the abrasion between the ash and the bracing and structures. Most typically, hard abrasive oxides, such as silica and iron oxide that typically are in ash, can abrade piping, ducting, fan blades and other components. The erosion results in a high wastage rate of the components. Excessive wastage of these and other components due to ash abrasion or erosion can increase power plant down-time to repair or replace worn components, and higher operating costs due to more frequent replacement of eroded components.

SUMMARY OF THE INVENTION

Briefly stated, an ash removal apparatus in accordance with the invention allows for improved separation of ash from the flue gas exiting a furnace. The ash removal apparatus has a hopper with a deflector and screen arrangement positioned in the hopper. Ash laden flue gas is directed by inlet ducting from the economizer of the furnace to the hopper having a hopper housing. The housing defines a flow chamber for the flow of the flue gas stream. The housing further defines a preferably horizontal upper inlet opening defining a front and rear edge, and a flue gas outlet opening generally orthogonal to the inlet opening defining an upper and lower edge. The front edge of the inlet opening is preferably adjacent the upper edge of the outlet opening. The hopper further defines a hopper collector below the housing, opposite the inlet opening and below the lower edge of the outlet opening.

Mounted within the flow chamber is a deflector having a plurality of preferably co-planar triangular block-off plates positioned across the inlet opening. The block-off plates define triangular initial flow path openings therebetween. The initial flow path openings define a smaller area than the total cross section of the inlet duct. The triangular initial flow path openings have a reduced portion and an expanded portion. The expanded portion is preferably positioned generally opposite the outlet opening of the housing or at the rear edge of the inlet opening. Triangular flow plates extend vertically downward from the edges of the block-off plates. The flow plates are preferably dimensioned to extend across both of the inlet and outlet openings.

Ash laden flue gas entering the housing through the inlet duct is accelerated at the initial flow path openings due to the block-off plates reducing the total cross-sectional area of the inlet opening. The accelerated ash laden flue gas is directed downward by the vertically oriented flow plates toward the hopper collector. The accelerated flue gas stream is also directed toward the rear portion of the hopper due to the expanded portions of the initial flow path openings being adjacent the rear portion of the hopper.

The leading edges of the flow plates are preferably cut away at an angle of approximately 45°. The lower edge portions of the flow plates therefore preferably extend between the rear edge of the inlet opening and the lower edge of the outlet opening. The cut-away of the flow plates allows the flue gas stream to re-expand, and further, the flow plates and hopper redirect the flue gas stream generally at a right angle toward the outlet opening in the housing. Fly ash in the flue gas stream, having been accelerated by the restriction of the block-off plates generally continues downward toward the hopper collector, even as the flue gas velocity decreases and is redirected toward the outlet opening of the housing.

The leading edge of the flow plates define second flow openings therebetween in fluid connection with the outlet opening of the hopper. The flue gas is then directed through the second flow path openings, through the outlet opening, and into the air preheater or other downstream apparatus. The second flow path openings are also generally triangular with the expanded portion of the triangle positioned adjacent the lower edge of the outlet opening and the reduced portion positioned adjacent the rear edge of the inlet opening. The orientation and shape of the flow plates also directs the flue gas stream in part upward as the flue gas stream flows through the second flow plate openings and out of the ash removal apparatus.

The ash removal apparatus in accordance with the invention further preferably has a plurality of ash screens oriented across the second flow path openings defined by the flow plates. The ash screens are preferably mounted to the lower edge portions of the flow plates and therefore are angled toward the hopper collector. Ash that remains entrained in the flue gas as the flue gas is redirected from a generally downward vertical direction to a horizontal and in part upward direction will strike the angled ash screens and be deflected downward into the hopper collector. In addition, the angle of the ash screens will tend to prevent fly ash from plugging the ash screen openings. In particular, angling the ash screens toward the hopper collector, in combination with the in part upward flow of the flue gas, and further in combination with the inherent force of the gravity, will cause fly ash impinging on the screens to deflect and drop downward into the hopper collector.

Therefore, an object of the invention is to provide a deflector for an ash collection hopper for the improved removal of ash from an ash laden flue gas stream.

Another object of the invention is to provide a deflector for an ash collection hopper wherein the ash laden flue gas stream is redirected in order to increase removal of ash from the ash laden flue gas stream.

It is still another object of the invention to provide a deflector that accelerates and redirects the flue gas stream in order to improve the removal of ash from an ash laden flue gas stream.

These and other objects of the invention will become apparent from reference to the specification and drawings.

DETAILED DESCRIPTION OF THE PREFERRED EMBODIMENT

Figure 1:
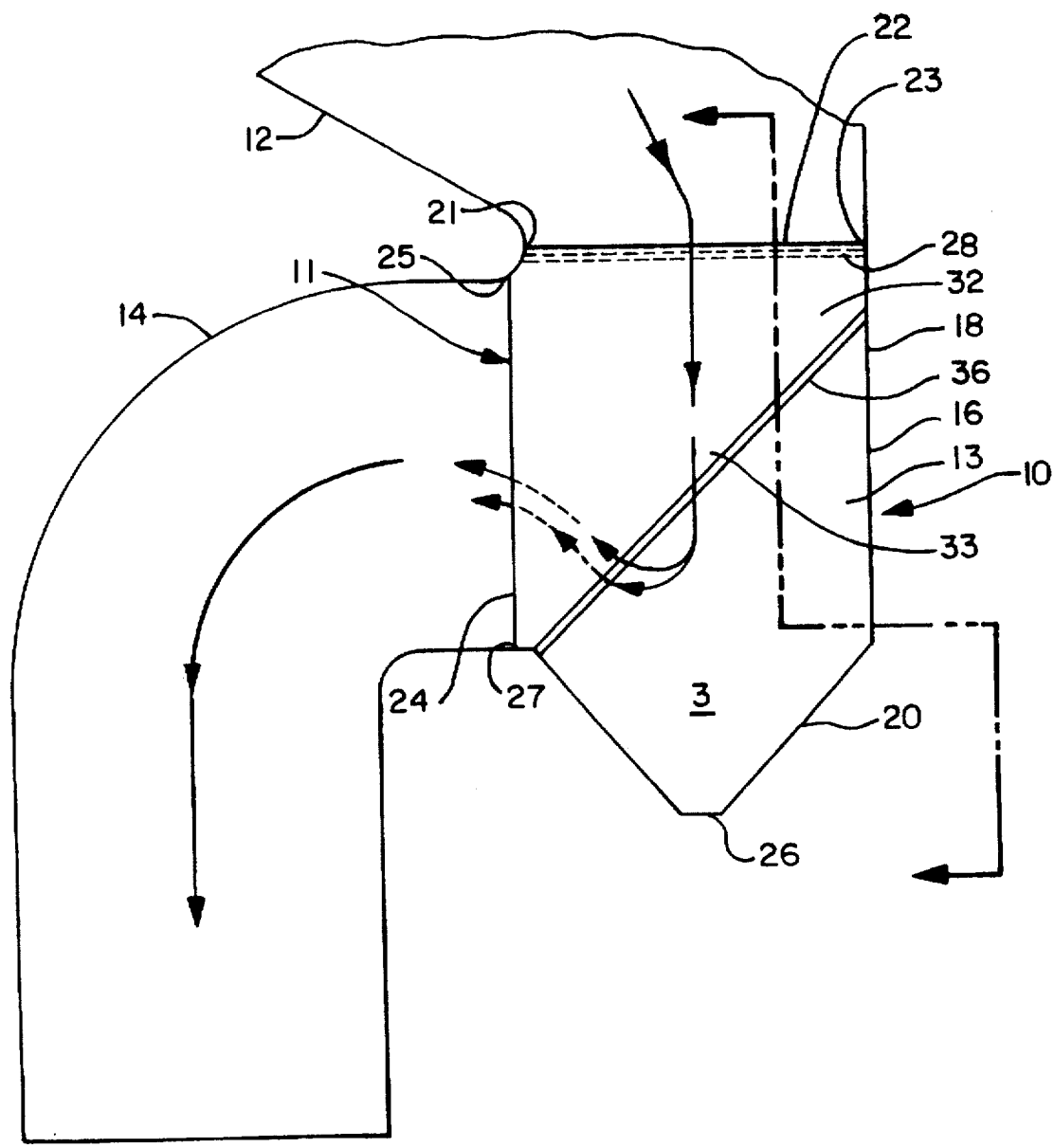
FIG. 1 is a partial cross-sectional view of an ash removal hopper having a deflector and ash screen arrangement in accordance with the invention.
Figure 2:
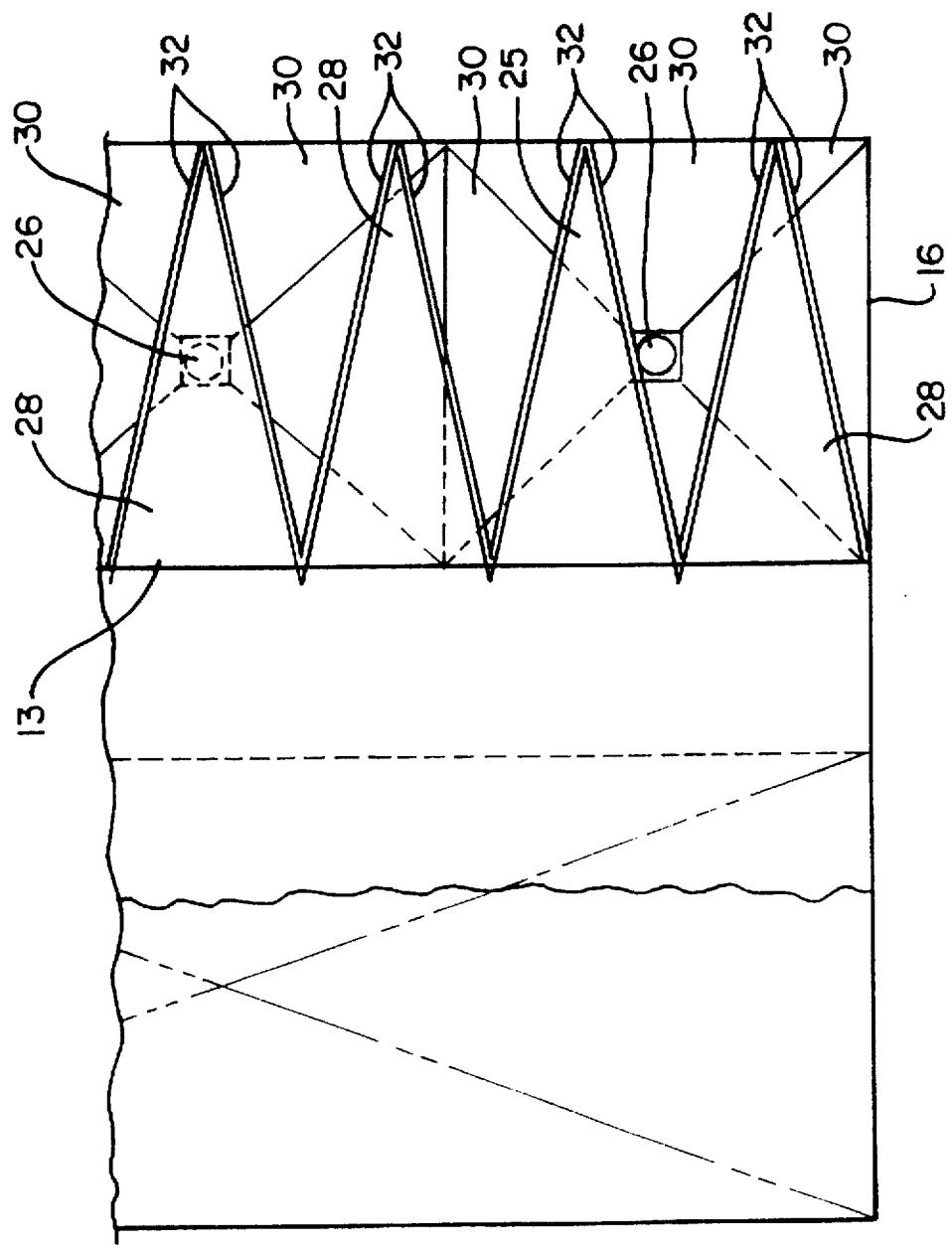
FIG. 2 is a partial top plan view, partially in phantom, of the hopper having the deflector and ash screen arrangement of FIG. 1.

Wherein like numerical identifiers represent like components throughout the figures, an apparatus for the removal of fly ash from a flue gas stream is generally designated by the numeral 10.

The ash removal apparatus 10 is positioned between a vertically oriented inlet duct 12 from the economizer of a furnace and a generally horizontally oriented outlet duct 14 connecting the ash removal apparatus 10 to an air preheater or other downstream apparatus (not shown). The ash removal apparatus 10 has a hopper 16 having an expanded upper hopper housing 18 and a reduced lower portion forming a hopper collector 20. The hopper collector 20 is conical or angled to direct collected ash to a collector port 26 for removal from the hopper 16. The hopper 16 can have multiple hopper collectors 20 for simplified removal of ash from the ash removing device 10.

The hopper housing 18 defines a flow chamber 13 therein for the flow of the flue gas stream. The hopper housing 18 further defines a generally horizontal inlet opening 22 at the upper portion of the hopper 16 and a generally vertical outlet opening 24 oriented orthogonally to the inlet opening 22. The inlet opening 22 has a front edge 21 and a rear edge 23. The outlet opening 24 has an upper edge 25 and a lower edge 27, wherein the upper edge 25 is positioned generally adjacent the front edge 21 of the inlet opening 22.

Positioned across the inlet opening 22 between the front and rear edges 21, 23 is a deflector 11 having a plurality of horizontally oriented co-planar triangular block-off plates 28. The block-off plates 28 define initial flow path openings 30 therebetween. The initial flow path openings 30 are preferably also triangular, having the enlarged or expanded portion of the flow path opening oriented toward the rear edge 23 of the inlet opening 22. Furthermore, the block-off plates 28 preferably extend horizontally across the entire width of the inlet opening 22 between the front and rear edges 21, 23.

The deflector 11 further has flow plates 32 extending vertically downward toward the hopper collectors 20 from the edges of the block-off plates 28 adjacent the flow path openings 30. The flow plates 32 extend horizontally across the entire width of the inlet opening 22 between the front and rear edges 21, 22 and further extend vertically across the entire height of the outlet opening 24 between the upper and lower edges 25, 27. The flow plates 32 define leading edges 33 preferably angled at approximately 45°. The leading edges 33 of the flow plates 32 extend generally between the rear edge of the inlet opening 22 and the lower edge 27 of the outlet opening 24.

The leading edges 33 of the flow plates 32 define second flow path openings 34 therebetween in fluid connection with the outlet opening 24. The second flow path openings 34 are also generally triangular wherein the expanded portion of each second flow path opening 34 is adjacent the lower edge 27 of the outlet opening 24 and the reduced portion is adjacent rear edge 23 of the inlet opening 22. The second flow path openings 34 are positioned generally below the individual block-off plates 28.

Ash screens 36 extend across the second flow path openings 34 to further remove ash from the flue gas stream. The ash screens 36 have a generally triangular shape and mount to the leading edges 33 of the flow plates 32. Therefore, the ash screens 36 are also angled at approximately 45° toward the hopper collectors 20 of the hopper 16. Alternately, the ash screens 36 can mount between the flow plates 32 closer to the outlet opening to define an angle of greater than 45° relative to the hopper collector 20.

During operation of the furnace employing the ash removal apparatus 10 in accordance with the invention, ash laden flue gases are directed from the economizer of the furnace by the inlet duct 12 to the inlet opening 22 of the hopper 16. The block-off plates 28 reduce the total cross-sectional area of the air duct 12 thereby accelerating the flue gas stream through the initial flow path openings 30. The block-off plates form a Venturi like structure to therefore accelerate the flue gas stream. The orientation of the triangular flow path openings 30, wherein the expanded portion is oriented toward the back or rear of the hopper 16, results in the majority of the flue gas stream being directed toward the back or rear of the hopper 16. The center of flow of the flue gas stream is preferably at ⅔ of the width of the inlet opening towards the rear of the hopper 16.

The flue gas stream is directed downward by the vertical flow plates 32 toward the hopper collectors 20. The flue gas stream is then directed by the flow plates 30 and hopper 16 around the leading edges 33 of the flow plates 30 and through the ash screens 36. The flue gas stream is also directed partly upward into the second flow path openings 34 and through the outlet opening 24 due to the shape and orientation of the flow plates 30.

The increased velocity of the flue gas and the suspended particles as a result of the block-off plates 28, together with the concentration of the flow of the flue gas toward the rear portion of the hopper 16, results in an enhanced separation of the ash particles from the flue gas stream due to the downward velocity of the particles toward the hopper collector 20. The arrangement of the block-off plates 28, flow plates 30 and hopper 16 also aids in this separation due to the drop in velocity as the flue gas flows down around the leading edges 33 of the flow plates 30 and flows horizontally and in part upwardly through the ash screens 36. The flue gas stream continues through the second flow openings 34 and exits the ash removing device 10 through the outlet opening 24. The cleaned flue gas is then directed by the outlet duct 14 into an air preheater or other apparatus located downstream.

The angled ash screens 36 above the hopper collectors 20 result in particles too large to pass through the screen openings being deflected directly back into the hopper collector 20. Furthermore, the inherent force of gravity will counteract the flow pressure of the flue gas stream to cause ash particles collected on the surface of the ash screens 36 to fall away and into the hopper collector 20.

The angular orientation of the ash screens 36 will preferably result in an ash screen area 40% greater than the cross sectional area of the flow path openings 30. Therefore, the flue gas stream will experience a loss of flow velocity between the initial and second flow openings 30, 34 which further helps segregate fly ash from the flue gas stream. It should be recognized that the triangular flow path openings 30, 34 can be reduced or increased in number without effecting the relationship of the cross-sectional areas of the initial flow path openings 30 and the second flow path openings 34.

Figure 3:
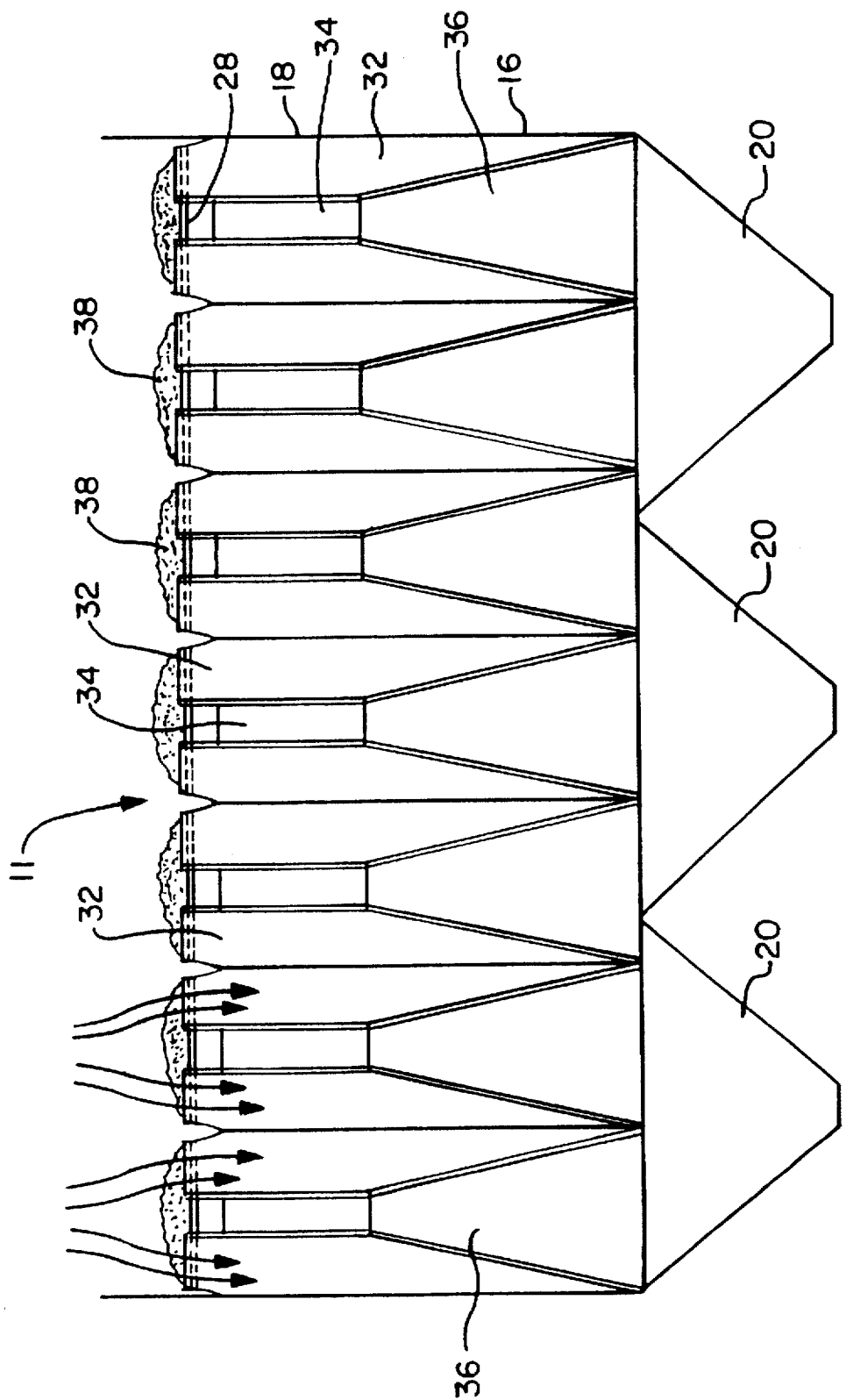
FIG. 3 is a frontal sectional view taken along the line 3—3 of the hopper, deflector and ash screen arrangement of FIG. 1.

In a further embodiment of the ash removing device 10 in accordance with the invention, the block-off plates 28 are recessed slightly relative to the upper edges of the flow plates 32 above the block-off plates 28. (See FIG. 3) The projection of upper edges of the flow plates 32 collects ash on the top surface of the block-off plates 28. This accumulation of ash 38 is desirable to form a protective layer of ash on the block-off plates 28 and therefore reduce erosion of the block-off plates 28 due to ash impingement. Additional ash in the flue gas stream will impinge on the collected ash 38 instead of eroding the block-off plates 28.

While a preferred embodiment of the present invention has been illustrated and described in detail, it should be readily appreciated that many modifications and changes thereto are within the ability of those of ordinary skill in the art. Therefore, the appended claims are intended to cover any and all of such modifications which fall within the true spirit and scope of the invention.

I claim:

1. An apparatus for the separation of ash from a flue gas stream comprising:

a hopper defining a flow chamber for the flow of a flue gas stream, an inlet opening having an area, an outlet opening generally orthogonal to said inlet opening, and hopper collector means generally for collection of ash from said flue gas;

deflector means in said flow chamber for deflecting said flue gas stream, said deflector means having a plurality of block-off means at said inlet opening for defining a plurality of initial flow path openings having an area less than said area of said inlet opening, said block-off means comprising a plurality of generally planar block-off plates defining said initial flow path openings therebetween, said block-off plates being triangular and defining triangular initial flow path openings, said initial flow path openings having an expanded portion and a narrow portion, said expanded portion oriented generally away from said outlet opening, and said deflector means further having a plurality of flow means extending generally orthogonally from said block-off means and adjacent said flow path openings for directing said flue gas toward said hopper collector means.

2. An apparatus for the separation of ash from a flue gas stream comprising:

a hopper defining a flow chamber for the flow of a flue gas stream, an inlet opening having an area, an outlet opening generally orthogonal to said inlet opening, and hopper collector means generally for collection of ash from said flue gas;

deflector means in said flow chamber for deflecting said flue gas stream, said deflector means having a plurality of block-off means at said inlet opening for defining a plurality of initial flow path openings having an area less than said area of said inlet opening, and a plurality of flow means extending generally orthogonally from said block-off means and adjacent said flow path openings for directing said flue gas toward said hopper collector means, said flow means defining second flow openings therebetween in fluid connection with said outlet opening, and further including screen means positioned across said second flow openings for screening ash from said flue stream.

3. The apparatus of claim 2 wherein said flow means comprises a plurality of generally planar flow plates.

4. The apparatus of claim 2 wherein said second flow openings have a cross-sectional area generally 40% greater than the cross-sectional area of said initial flow openings.

5. The apparatus of claim 2 wherein said screen means are oriented at a generally 45° angle from said block-off plates.

6. An apparatus for the separation of ash from a flue gas stream comprising:

a hopper defining a flow chamber for a flue gas stream having an upper portion and a lower portion, said upper portion defining a horizontal flue gas inlet opening and a vertical flue gas outlet opening, said lower portion defining a hopper collector opposite said inlet opening;

a plurality of generally planar block-off plates oriented horizontally across said flue gas inlet opening, said block-off plates having a generally triangular shape defining a plurality of triangular initial flow path openings therebetween, said initial flow path openings having an expanded portion and a reduced portion, said expanded portions oriented away from said flue gas outlet opening;

a plurality of flow plates mounted to said block-off plates adjacent said flow path openings and extending vertically downward toward said hopper collector, said flow plates defining second flow path openings therebetween in fluid connection with said flue gas outlet opening.

7. The apparatus of claim 6 wherein said flow plates have a generally triangular shape defining a first edge portion mounted to said block-off plates, a second edge portion extending substantially across said outlet opening and a third leading edge portion angled toward said hopper collector.

8. The apparatus of claim 7 further comprising screens oriented across said second flow path openings.

9. The apparatus of claim 8 wherein said screens are angled toward said hopper collector at generally 45°.

10. An apparatus for the removal of ash from a flue gas stream comprising:

a hopper having a hopper housing defining a flow path chamber, horizontally oriented inlet opening having a front edge and a rear edge, and a vertically oriented outlet opening having an upper edge and a lower edge, said upper edge adjacent said front edge of said inlet opening, and a hopper collector opposite said inlet opening and below said lower edge of said outlet opening;

a deflector in said flow chamber having a plurality of block-off plates horizontally oriented across said inlet opening, said block-off plates defining initial flow openings having an expanded portion and a reduced portion, said expanded portion adjacent said rear edge of said inlet opening, and a plurality of flow plates extending vertically downward from said block-off plates adjacent said initial flow openings, said flow plates having a first edge extending between said front and rear edges of said inlet opening, a second edge extending between said upper and lower edges of said outlet opening, and a third edge extending between said lower edge of said outlet opening and said rear edge of said inlet opening.

11. The apparatus of claim 10 wherein said block-off plates are triangular and define triangular initial flow openings.

12. The apparatus of claim 10 wherein said first edges of said flow plates extend above said block-off plates.

13. The apparatus of claim 10 further comprising a plurality of ash screens mounted at said third edges of said flow plates wherein the ash screens are generally below said block-off plates.

14. A method for separating ash from a flue gas stream comprising:

flowing a gas stream comprising ash and flue gas downward through a duct having a flow area;

reducing said flow area to accelerate said flue gas stream downward toward a hopper collector;

increasing said flow area to decelerate said flue gas stream;

redirecting said flue gas stream generally horizontally whereby a portion of said ash in said flue gas stream continues vertically downward toward said hopper collector, and said flue gas and the remaining portion of said ash flow generally horizontally; and screening said flow stream after redirecting said flow stream generally horizontally.

15. The method of claim 14 wherein said step of screening comprises flowing said flue gas stream through a screen oriented at an angle to the generally horizontal flow of the flue gas and deflecting a portion of said remaining ash off of said screen toward said hopper collector.

16. A method of separating ash from the flue gas stream exiting a furnace comprising:

flowing an ash laden flue gas stream generally vertically downward through an inlet duct having a flow area;

reducing the flow area to accelerate the flue gas stream generally vertically downward;

increasing the flow area to decelerate the flue gas stream and redirecting the flue gas flow from generally vertically to generally horizontally;

screening ash from the flue gas stream; and flowing the flue gas through an outlet duct.

* * * * *